(12) United States Patent
Fero et al.

(10) Patent No.: US 6,959,956 B1
(45) Date of Patent: Nov. 1, 2005

(54) ACOUSTICALLY TRANSPARENT VISOR

(75) Inventors: Mark W. Fero, Clinton Township, MI (US); David J. Prince, Villa Park, IL (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/858,903

(22) Filed: Jun. 2, 2004

(51) Int. Cl.[7] ................................. B60J 3/00
(52) U.S. Cl. ................. 296/97.5; 296/97.1; 296/214
(58) Field of Search ............... 296/97.1, 97.5, 296/214

(56) References Cited

U.S. PATENT DOCUMENTS

| | | | | |
|---|---|---|---|---|
| 2,045,751 A | * | 6/1936 | Burlein | 296/97.5 |
| 4,362,907 A | * | 12/1982 | Polacsek | 296/97.5 |
| 5,454,616 A | | 10/1995 | Aymerich et al. | |
| 6,318,797 B1 | * | 11/2001 | Bohm et al. | 296/214 |
| 6,345,102 B1 | * | 2/2002 | Davis et al. | 381/86 |
| 6,555,042 B1 | * | 4/2003 | Mola et al. | 264/258 |
| 6,698,816 B1 | * | 3/2004 | Sturt et al. | 296/214 |
| 6,760,461 B2 | * | 7/2004 | Azima et al. | 296/97.1 |
| 2001/0012369 A1 | * | 8/2001 | Marquiss | 381/86 |

* cited by examiner

Primary Examiner—Jason Morrow
(74) Attorney, Agent, or Firm—Brooks Kushman P.C.

(57) ABSTRACT

A sun visor for use with a motor vehicle includes a visor body having sufficient acoustic transmissibility such that the visor body is sufficiently sound transparent. The visor body further being sufficiently opaque so as to inhibit passage of light through the visor body.

23 Claims, 6 Drawing Sheets

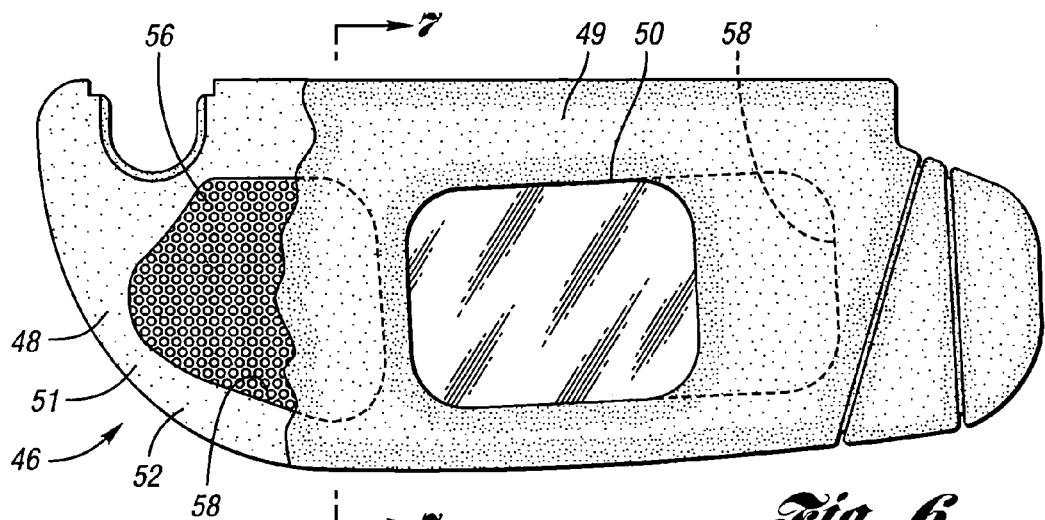
Fig. 6
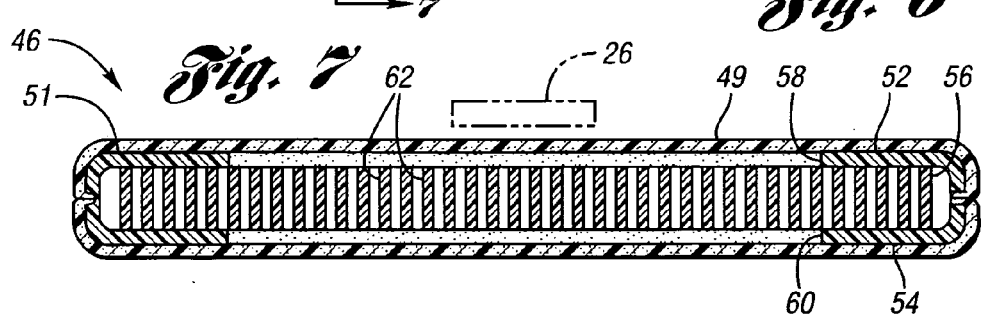
Fig. 7
Fig. 8
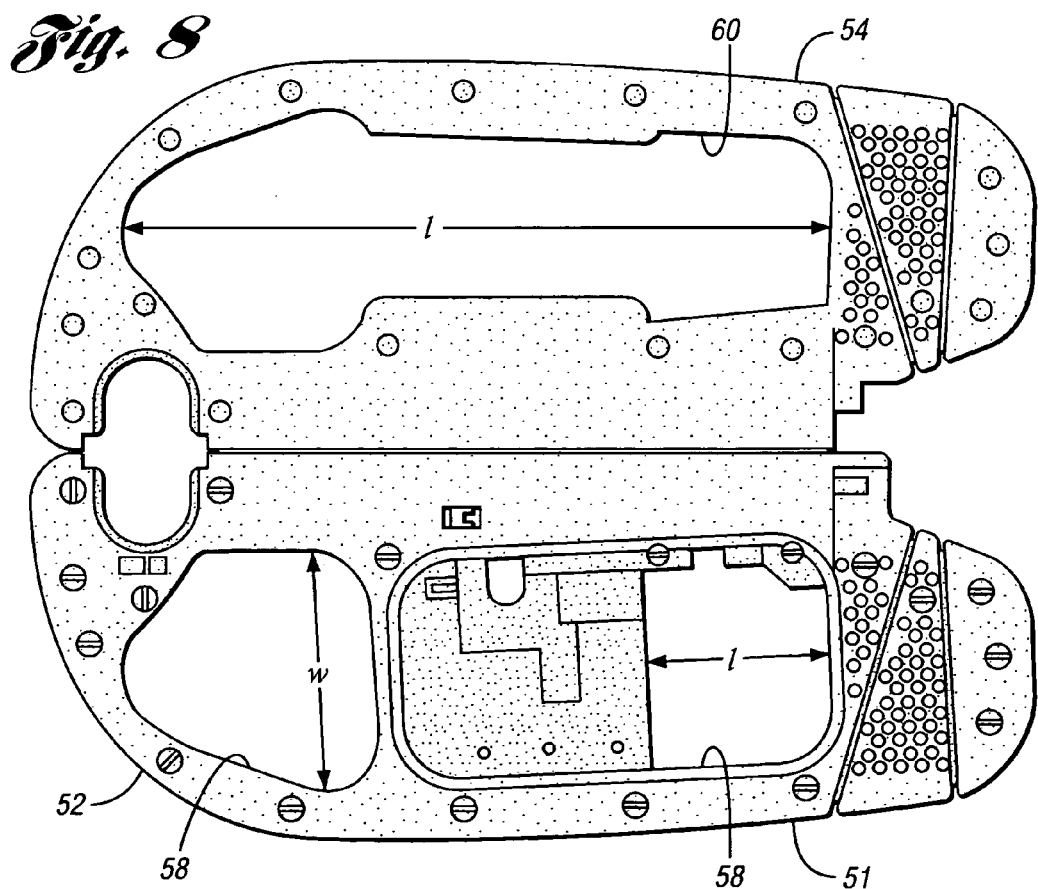

ACOUSTICALLY TRANSPARENT VISOR

BACKGROUND OF THE INVENTION

1. Field of the Invention

The invention relates to a sun visor for use with a motor vehicle.

2. Background Art

A prior sun visor for use with a motor vehicle includes a solid, rigid plastic substrate and a cover material surrounding the substrate. Because the substrate is solid and rigid, sound waves are not able to readily pass through the substrate. As a result, it is not desirable to use such a sun visor with a headliner having an audio system component positioned above the sun visor.

SUMMARY OF THE INVENTION

Under the invention, a sun visor for use with a motor vehicle is provided. The sun visor includes a visor body having sufficient acoustic transmissibility such that the visor body is sufficiently sound transparent. The visor body further being sufficiently opaque so as to inhibit passage of light through the visor body.

Further under the invention, a headliner arrangement for use with a motor vehicle is provided. The headliner arrangement includes a headliner assembly having a headliner body and an audio system element attached to the headliner body. The arrangement further includes a sun visor disposable on the headliner body proximate the audio system element. The sun visor includes a visor body having sufficient acoustic transmissibility such that the visor body is sufficiently sound transparent. The visor body further being sufficiently opaque so as to inhibit passage of light through the visor body.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 6 is a front view of a second embodiment of a visor body including a visor substrate surrounded by a cover material, wherein the cover material is broken away to show the substrate;

FIG. 7 is a cross-sectional view of the visor body of FIG. 6, wherein the visor substrate includes a clamshell structure and an insert disposed between first and second portions of the clamshell structure;

FIG. 8 is a plan view of the clamshell structure of FIG. 7 shown in an unfolded condition;

DETAILED DESCRIPTION OF THE PREFERRED EMBODIMENT(S)

Figure 1:
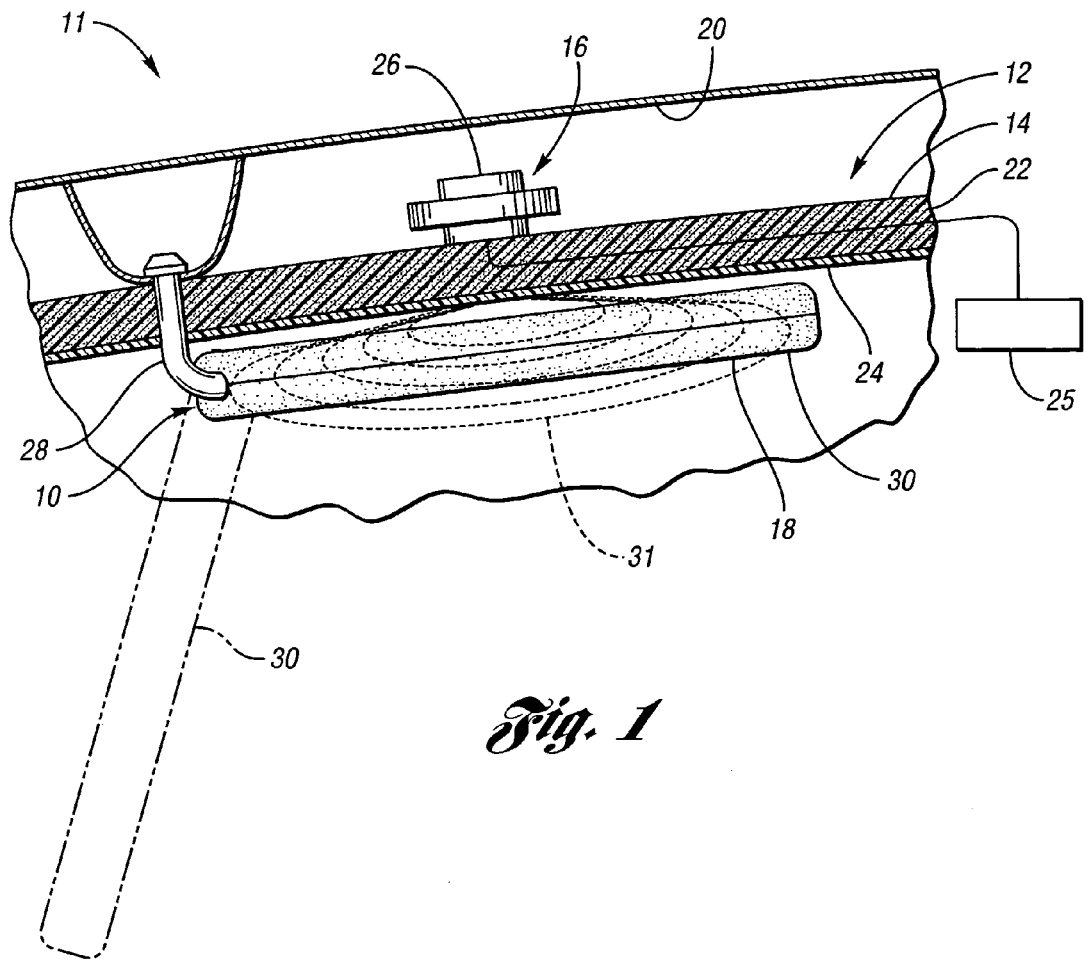
FIG. 1 is a schematic view of a sun visor according to the invention mounted on a headliner assembly.

FIG. 1 shows a headliner arrangement 10 according to the invention for use with a motor vehicle 11. The headliner arrangement 10 comprises a headliner assembly 12 including a headliner body 14 and an audio and/or communication system 16 associated with the headliner body 14. The headliner arrangement 10 further includes one or more acoustically transparent sun visors 18 disposed on the headliner body 14. Although the headliner arrangement 10 preferably includes multiple sun visors 18, only one sun visor 18 is shown in the drawings and described below in detail.

The headliner body 14 is attachable to the vehicle 11 such that the headliner body 14 is disposed proximate a roof 20 of the vehicle 11. Furthermore, the headliner body 14 may have any suitable configuration and include any suitable materials. For example, the headliner body 14 may include a single or multi-layer substrate 22, and a cover layer 24 attached to the substrate 22. In one embodiment, the substrate 22 is made of a sufficiently rigid material, such as thermal-foamable rigid urethane (TRU), and the cover layer 24 includes a fabric layer provided with or without a backing layer.

The system 16 may be configured as an audio system and/or a two way communication system. Moreover, the system 16 may include an audio or signal source 25, such as a tuner, cassette player, compact disc player, DVD player, communications unit, etc., and one or more acoustic elements 26, such as electro-magnetic acoustic transducers, that are attached to the headliner body 14 and electrically connected to or otherwise associated with the signal source 25.

If the system 16 is configured as an audio system, for example, the system 16 may include two acoustic elements 26 located forward of each seating position in the vehicle 11, and an additional row of acoustic elements 26 at the rear of the vehicle 11. Thus, for a sedan having two front and two rear main seating positions, the system 16 may include four front, four central and four rear acoustic elements 26.

The acoustic elements 26 may be configured to transmit energy into the headliner body 14 such that acoustic elements 26 and headliner body 14 cooperate to form an integrated speaker assembly. More specifically, the acoustic elements 26 may function as electromechanical drive motors that convert electrical signals into mechanical motion, and the headliner body 14 may function as a speaker diaphragm that vibrates in response to the mechanical motion of the acoustic elements 26. Additional details of such an assembly are disclosed in U.S. patent application Ser. No. 10/049,993 which is hereby incorporated by reference in its entirety.

As another example, each acoustic element 26 may be a speaker mounted on or integrated into the headliner body 14. For example, the acoustic elements 26 may be sandwiched between adjacent layers of the headliner body 14.

If the system 16 is configured as a communication system, the system 16 may include one or more acoustic elements 26 configured as microphones.

The sun visor 18 may be disposed on the headliner body 14 proximate one or more acoustic elements 26. The sun visor 18 may include a support rod 28 pivotally attached to the headliner body 14 and/or roof 20, such as with a bracket, and a visor body 30 rotatably mounted on the support rod 28.

The visor body 30 is moveable between a stowed position (shown in solid lines in FIG. 1) in which the visor body 30 is disposed adjacent the headliner body 14, and a deployed or use position (shown in phantom lines in FIG. 1). Furthermore, the visor body 30 may at least partially cover one or more acoustic elements 26 when the visor body 30 is in the stowed position. In the embodiment shown in FIG. 1, for example, the visor body 30 completely covers an acoustic element 26 when the visor body 30 is in the stowed position.

As explained below in detail, the visor body 30 is configured to have sufficient acoustic transmissibility such that sound waves 31 may readily pass or otherwise be transmitted through the visor body 30. In other words, the visor body 30 is configured to be sufficiently sound transparent. Moreover, the visor body 30 is preferably sufficiently opaque so as to inhibit passage of light through the visor body 30.

Figure 2:
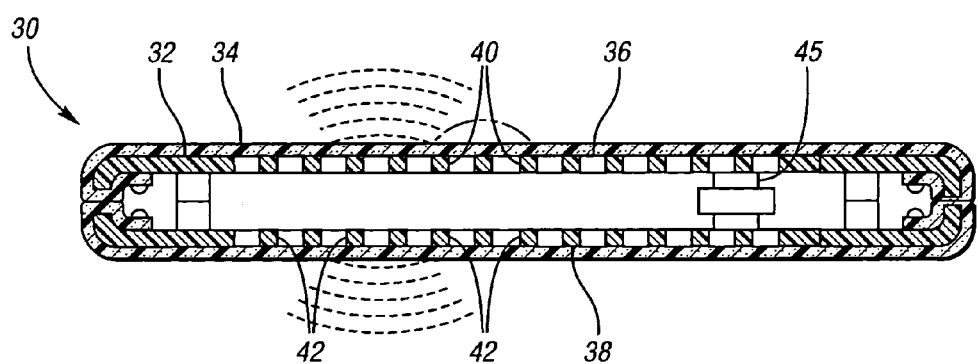
FIG. 2 is a cross-sectional view of the sun visor showing a perforated visor substrate surrounded by a cover material.

Referring to FIG. 2, for example, the visor body 30 may include a perforated substrate 32 and a cover material 34 attached to the substrate 32. While the substrate 32 may have any suitable configuration, in the embodiment shown in FIG. 2, the substrate 32 comprises a clamshell structure having first and second portions 36 and 38, respectively, that are folded together. Furthermore, the first portion 36 has multiple first holes 40 that extend through the first portion 36, and the second portion 38 has multiple second holes 42 that are generally aligned with the first holes 40 and that extend through the second portion 38. Alternatively, the second holes 42 may be offset with respect to the first holes 40. The holes 40 and 42 are configured to allow sound waves to pass through the visor body 30.

The holes 40 and 42 may have any suitable shape and size, and may be spaced apart any suitable distance. For example, referring to FIGS. 3 and 4, the holes 40 and 42 may have a generally circular shape, a width or diameter in the range of 0.5 to 10 millimeters (mm), and a pitch in the range of 2 to 10 mm (measured hole center to hole center). In one embodiment of the invention, the holes 40 and 42 have a generally circular shape, a diameter in the range of 2.5 to 3.0 mm, and a pitch in the range of 4.8 to 5.2 mm. As another example, the holes 40 and 42 may each have a generally rectangular or generally triangular shape.

Figure 3:
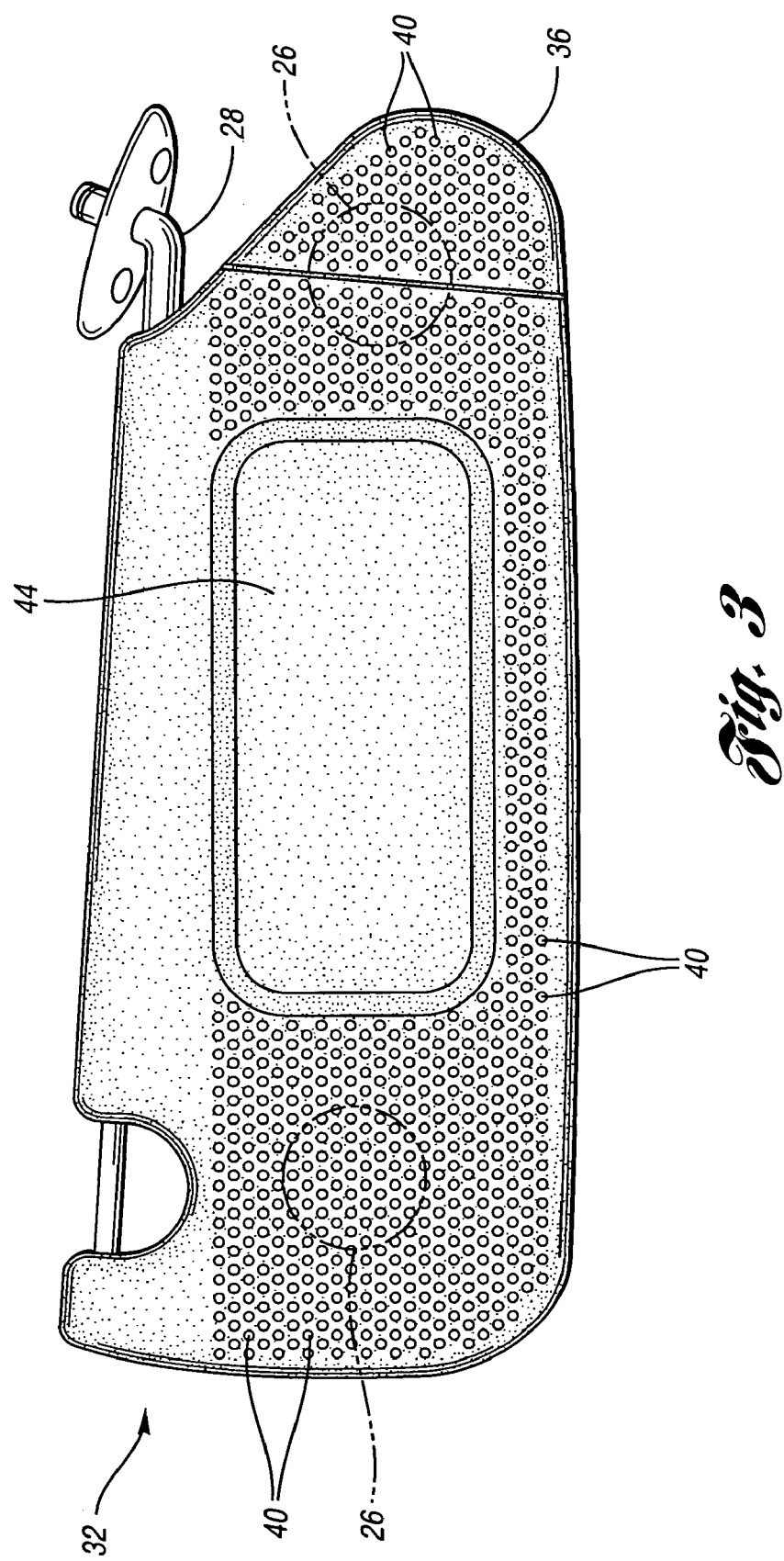
FIG. 3 is a front view of the substrate.

The holes 40 and 42 may be provided along and across the entire exterior surface of the respective portion 36 and 38, or at one or more select areas of the respective portion 36 and 38. For example, a majority of the first portion 36 may be provided with first holes 40, and a majority of the second portion 38 may be provided with second holes 42. As shown in FIG. 3, an area 44 of the first portion 36 that receives a vanity mirror may be provided without holes if desired. However, the second portion 38 preferably, but not necessarily, has second holes 42 disposed behind or beneath the area 44 of the first portion 36.

Figure 4:
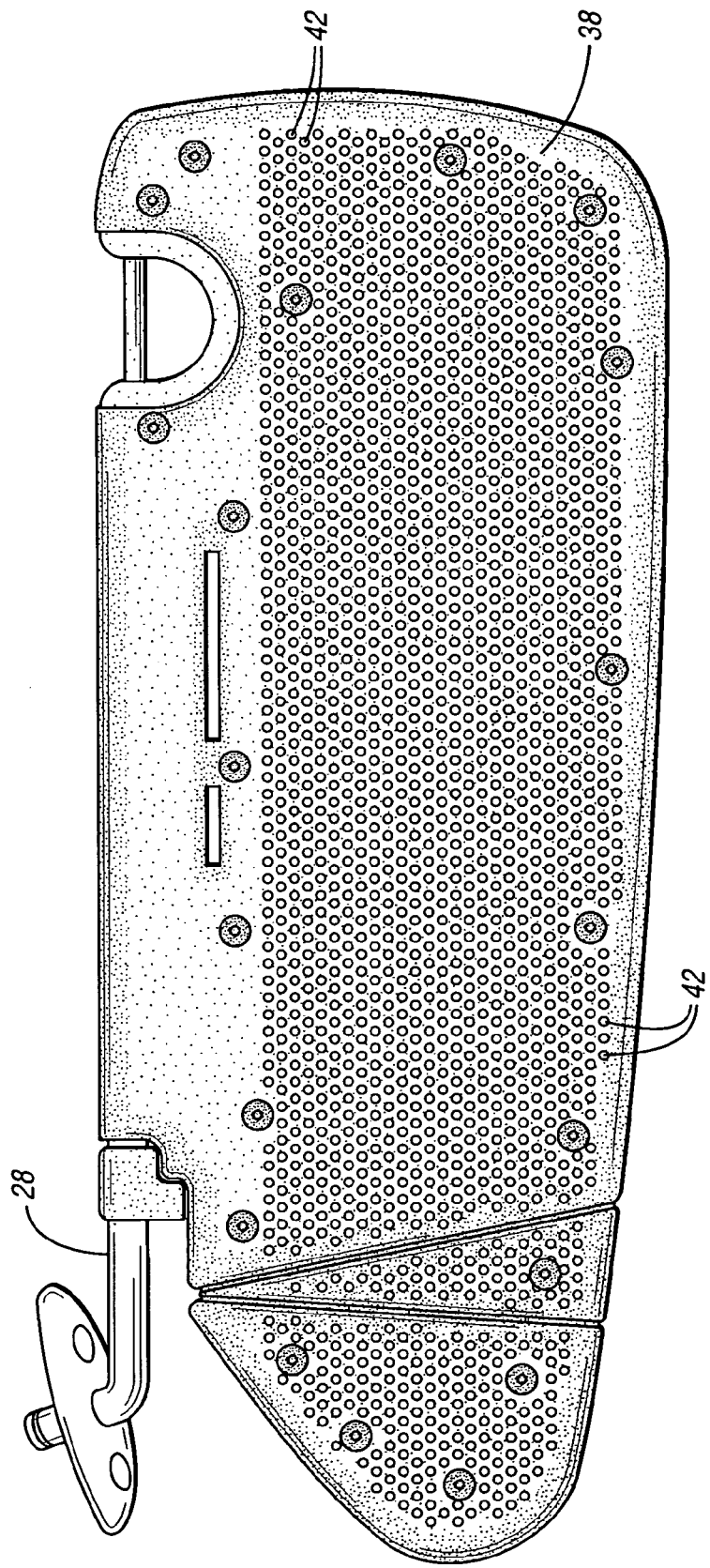
FIG. 4 is a rear view of the substrate.
Figure 5:
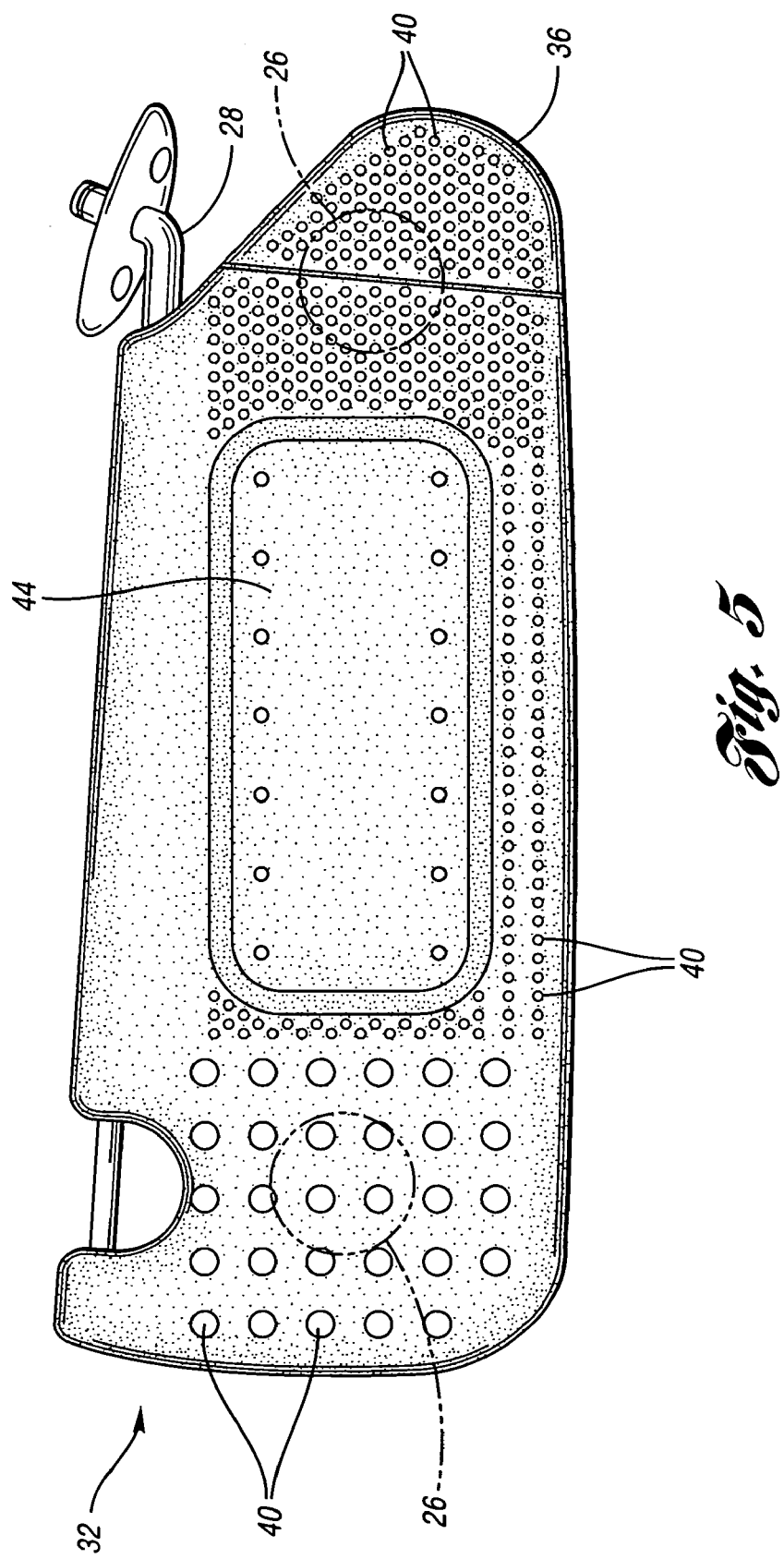
FIG. 5 is an additional front view of the substrate showing various examples of hole configurations.

Although FIGS. 3 and 4 show the holes 40 and 42 with generally the same shape, size and spacing, the shape, size and spacing of the holes 40 and 42 may vary over the portions 36 and 38 of the substrate 32. FIG. 5, for example, shows different hole diameters and pitches for the first portion 36.

FIG. 3 also shows example locations of two acoustic elements 26 (shown in phantom lines) relative to the first portion 36 of the substrate 32 when the substrate 32 is in the stowed position. Alternatively, the acoustic elements 26 may each be located in or on the headliner body 14 in any suitable location relative to the substrate 32.

The substrate 32 may comprise any suitable materials and may be made in any suitable manner. For example, the substrate 32 may be made of plastic in an injection or compression molding process. Examples of suitable plastics include polypropylene, acrylonitrile butadiene styrene (ABS), polycarbonate (PC), or ABS/PC blends. Furthermore, the holes 40 and 42 may be formed during such a molding process, or the holes 40 and 42 may be formed subsequently, such as by using a drill or punch.

The cover material 34 is sufficiently air-permeable to facilitate the passage of sound waves. For example, the cover material 34 may have a permeability of at least 200 cubic feet ($ft^3$) of air flow per square foot ($ft^2$) of material per minute at a pressure of 30 inches of mercury. In one embodiment of the invention, the cover material 34 has a permeability of at least 250 $ft^3$ of air flow per $ft^2$ of material per minute at a pressure of 30 inches of mercury.

Furthermore, the cover material 34 may comprise any suitable material or materials. For example, the cover material 34 may include a fabric layer provided with or without a backing layer, such as an open cell foam backing layer.

With the configuration described above, the sun visor 18 is sufficiently acoustically transparent such that sound waves may readily pass through the visor body 30 toward or away from the headliner assembly 12. As a result, the sun visor 18 may allow an even distribution of sound waves generated by the headliner assembly 12 when the sun visor 18 is in the stowed position. However, the cover material 34 is sufficiently opaque such that the visor body 30 may effectively block sun light or other light.

In one embodiment of the invention, the visor body 30 may have a permeability of at least 200 $ft^3$ of air flow per $ft^2$ per minute at a pressure of 30 inches of mercury. With such a configuration, the visor body 30 may allow passage of sound at frequencies up to 800 hertz (Hz) with less than 5 decibels (dB) of transmission loss.

Referring to FIG. 2, the sun visor 18 may also include an acoustic element or transducer 45, such as a microphone or speaker element, disposed within the substrate 32 of the visor body 30. Advantageously, the visor body 30 may be configured to allow passage of sound waves to or from the acoustic transducer 45.

Referring to FIGS. 6 and 7, a second embodiment 46 of a visor body according to the invention is shown. The visor body 46 includes a substrate 48, a cover material 49 attached to the substrate 48, and a vanity mirror assembly 50 attached to the substrate 48. The substrate 48 includes a clamshell structure 51 having first and second portions 52 and 54, respectively, that are folded together, and an insert 56 disposed between the portions 52 and 54.

Referring to FIGS. 6–8, the first portion 52 may have one or more first holes or openings 58 formed therein, and the second portion 54 may have one or more second holes or openings 60 formed therein. In the embodiment shown in FIGS. 7 and 8, at least a portion of each first opening 58 is generally aligned with at least a portion of a second opening 60. Furthermore, each opening 58 and 60 may be generally aligned with an audio system element 26 (shown in phantom lines in FIG. 7) disposed on a headliner body (not shown) when the visor body 46 is in a stowed position adjacent the headliner body. In such a case, each opening 58 and 60 is preferably, but not necessarily, larger than the corresponding audio system element. For example, each opening 58 and 60 may have a width w in the range of 1 to 5 centimeters (cm) and a length l in the range of 1 to 40 cm.

The insert 56 includes multiple holes 62 that extend through the insert 56. Some of the holes 62 are generally aligned with and extend between the openings 58 and 60 such that the substrate 48 is sufficiently acoustically transparent. In the embodiment shown in FIGS. 6 and 7, the holes 62 are substantially smaller than the openings 58 and 60, such that multiple holes 62 extend between the openings 58 and 60.

Like the holes 40 and 42 of the substrate 32, the holes 62 may have any suitable shape and size, and may be spaced apart any suitable distance. For example, the holes 62 may have any of the configurations described above with respect to the holes 40 and 42. In one embodiment of the invention, the insert 56 may have a honeycomb configuration.

Furthermore, the insert 56 may comprise any suitable material or materials and may be made in any suitable manner. For example, the insert 56 may comprise plastic, such as polypropylene, and may be made in an injection or compression molding process.

The cover material 49 may have the same or similar characteristics as described above with respect to the cover material 34. Furthermore, like the cover material 34, the cover material 49 may comprise any suitable material or materials. For example, the cover material 49 may include a fabric layer provided with or without a backing layer, such as an open cell foam backing layer.

Figure 9:
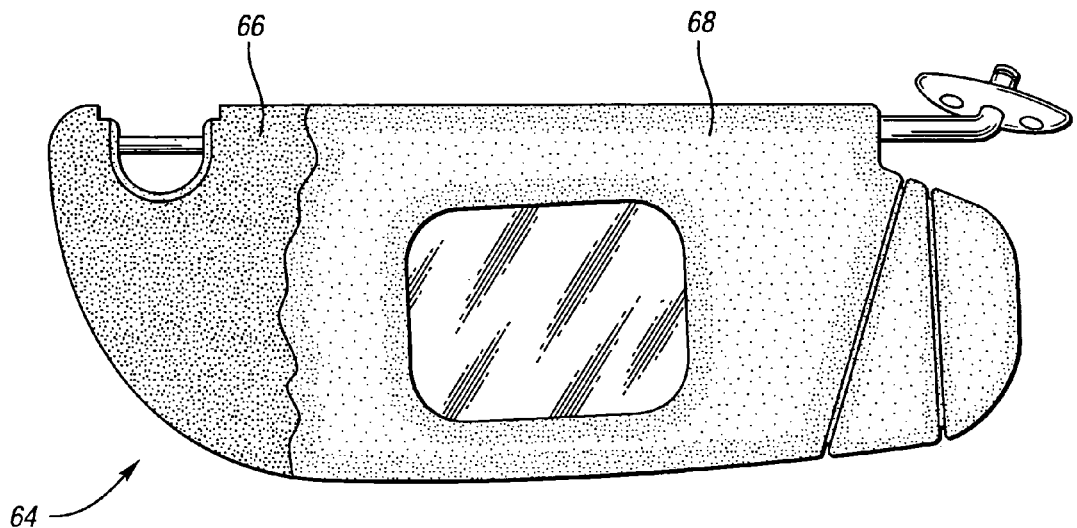
FIG. 9 is a front view of a third embodiment of a visor body including a visor substrate surrounded by a cover material, wherein the cover material is broken away to show the substrate.

FIG. 9 shows a third embodiment 64 of a visor body according to the invention. The visor body 64 includes a rigid porous substrate 66 having sufficient acoustic transmissibility, and an air-permeable cover material 68, similar to the cover materials described above, surrounding the substrate 66. For example, the substrate 66 may comprise a sintered material, such as metal or plastic, or a sufficiently rigid foam, such as expanded polypropylene or polyurethane.

Figure 10:
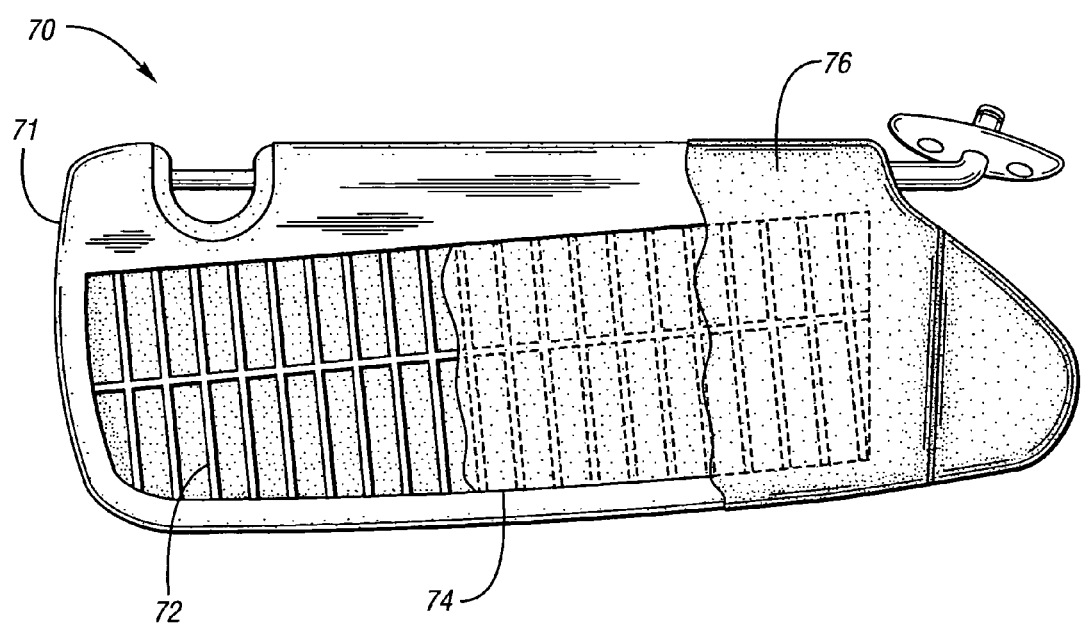
FIG. 10 is a front view of a fourth embodiment of a visor body including a visor substrate surrounded by a cover material, the substrate including an open support structure and a flexible membrane attached to the support structure, wherein the cover material is broken away to show the substrate, and the flexible membrane of the substrate is broken away to shown the open support structure.

FIG. 10 shows a fourth embodiment 70 of a visor body according to the invention. The visor body 70 includes a substrate 71 having an open support structure, such as frame 72, and a flexible thin film or membrane 74 attached to the frame 72. The visor body 70 further includes an air-permeable cover material 76, similar to the cover materials described above, surrounding the substrate 71.

The membrane 74 may comprise any suitable material, such as polyvinyl chloride, vinyl, etc. Furthermore, the membrane 74 may be air-impermeable. With such a configuration, the visor body 70 may pass or otherwise transmit sound through vibration of the membrane 74. More specifically, sound on one side of the membrane 74 may cause the membrane 74 to vibrate. The membrane 74 may then cause air on the other side of the membrane 74 to vibrate, thereby transmitting the sound through the visor body 70.

Although only one membrane 74 is shown on a front side of the frame 72, the visor body 70 may include multiple membranes 74 attached to the frame 72. For example, the visor body 70 may include an additional membrane 74 on a back side of the frame 72. As another example, if the visor body 70 includes a vanity mirror assembly (not shown), the visor body 70 may include a membrane 74 disposed on each side of the vanity mirror assembly. Alternatively, the membrane or membranes 74 may be omitted, and the frame 72 or other open support structure may be configured to allow passage of sound waves.

As yet another alternative, the cover material 76 may be omitted if not required for a particular application. In such a case, the membrane 74 may be sufficiently opaque to effectively block sun light or other light.

With any of the above configurations, the visor body may be configured to allow passage of sound at frequencies up to 800 Hz with less than 5 dB of transmission loss. Moreover, any of the above visor bodies may be configured to allow passage of sound at frequencies up to 1400 Hz with less than 3 dB of transmission loss.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, the insert 56 described above with respect to the visor body 46 may be made of a sintered material or foam, such as described above with respect to the visor body 64. As another example, an acoustic element or transducer may be incorporated into any of the above described visor bodies.

What is claimed is:

1. A sun visor for use with a motor vehicle, the sun visor comprising:
a visor body having sufficient acoustic transmissibility such that the visor body is configured to allow passage of sound at frequencies up to 800 Hz with less than 5 dB of transmission loss, the visor body further being sufficiently opaque so as to inhibit passage of light through the visor body.

2. The sun visor of claim 1 wherein the visor body includes a visor substrate having multiple holes extending therethrough, and a cover material that substantially covers the holes.

3. The sun visor of claim 2 wherein spacing of the holes is tuned to a target sound frequency range.

4. The sun visor of claim 2 wherein adjacent holes are spaced less than 10 millimeters apart, measured hole center to hole center.

5. The sun visor of claim 2 wherein the visor substrate includes a clamshell structure having first and second portions folded together, and wherein the multiple holes include multiple first holes formed in the first portion, and multiple second holes formed in the second portion.

6. The sun visor of claim 1 wherein the visor body includes first and second opposing portions and an acoustically transmissive insert disposed between the opposing portions.

7. The sun visor of claim 1 wherein the visor body includes a porous substrate.

8. The sun visor of claim 1 wherein the visor body includes a support structure and a flexible membrane attached to the support structure.

9. The sun visor of claim 8 wherein the flexible membrane is air impermeable.

10. The sun visor of claim 1 wherein the visor body includes first and second opposing portions, the first portion having a first area configured to provide acoustic transmissibility, and the second portion having a second area configured to provide acoustic transmissibility, the first and second areas differing in extent.

11. The sun visor of claim 1 further comprising an acoustic transducer disposed proximate the visor body.

12. A headliner arrangement for use with a motor vehicle, the headliner arrangement comprising:
a headliner assembly including a headliner body and an acoustic element attached to the headliner body; and
a sun visor disposable on the headliner body proximate the acoustic element, the sun visor comprising a visor body having acoustic transmissibility and being sufficiently opaque so as to inhibit passage of light through the visor body.

13. The headliner arrangement of claim 12 wherein the visor body includes a substrate and an air permeable cover material covering at least a portion of the substrate, the substrate having multiple holes extending therethrough.

14. The headliner arrangement of claim 12 wherein the visor body includes first and second opposing portions and an acoustically transmissive insert disposed between the opposing portions.

15. The headliner arrangement of claim 12 wherein the visor body is moveable between a stowed position and a deployed position, and the visor body at least partially covers the acoustic element when the visor body is in the stowed position.

16. The headliner arrangement of claim 15 wherein the acoustic element comprises an electromagnetic transducer.

17. The headliner arrangement of claim 15 wherein the acoustic element comprises a speaker.

18. The headliner arrangement of claim 12 wherein the visor body is configured to allow passage of sound at frequencies up to 800 Hz with less than 5 dB of transmission loss.

19. The headliner arrangement of claim 12 wherein the visor body is configured to allow passage of sound at frequencies up to 1400 Hz with less than 3 dB of transmission loss.

20. The headliner arrangement of claim 15 wherein the acoustic element comprises a microphone.

21. A sun visor for use with a motor vehicle, the sun visor comprising:
a visor body having acoustic transmissibility and being sufficiently opaque so as to inhibit passage of light through the visor body, wherein the visor body includes a visor substrate having multiple holes extending therethrough, and a cover material that substantially covers the holes, and wherein spacing of the holes is tuned to a target sound frequency range.

22. A sun visor for use with a motor vehicle, the sun visor comprising:
a visor body having acoustic transmissibility and being sufficiently opaque so as to inhibit passage of light through the visor body, wherein the visor body includes a visor substrate having multiple holes extending therethrough, and a cover material that substantially covers the holes, and wherein adjacent holes are spaced less than 10 millimeters apart, measured hole center to hole center.

23. A sun visor for use with a motor vehicle, the sun visor comprising:
a visor body having acoustic transmissibility and being sufficiently opaque so as to inhibit passage of light through the visor body, the visor body including a visor substrate having multiple holes extending therethrough, and a cover material that substantially covers the holes, wherein the visor substrate includes a clamshell structure having first and second portions folded together, and wherein the multiple holes include multiple first holes formed in the first portion, and multiple second holes formed in the second portion.

* * * * *